United States Patent
Craske (10) Patent No.: US 10,691,701 B2
(45) Date of Patent: Jun. 23, 2020

(54) ITEM SELECTION APPARATUS

(71) Applicant: ARM LIMITED, Cambridge (GB)

(72) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 328 days.

(21) Appl. No.: 15/678,430

(22) Filed: Aug. 16, 2017

(65) Prior Publication Data

US 2019/0057092 A1 Feb. 21, 2019

(51) Int. Cl.
   *G06F 16/2457* (2019.01)
   *G06F 16/22* (2019.01)
   *G06F 7/22* (2006.01)
   *G06F 7/00* (2006.01)

(52) U.S. Cl.
   CPC .......... *G06F 16/24578* (2019.01); *G06F 7/00* (2013.01); *G06F 7/22* (2013.01); *G06F 16/2246* (2019.01); *G06F 2207/226* (2013.01)

(58) Field of Classification Search
   USPC .......................... 708/232, 523, 625; 707/723
   See application file for complete search history.

(56) References Cited

U.S. PATENT DOCUMENTS

| | | | | |
|---|---|---|---|---|
| 4,839,847 A | * | 6/1989 | Laprade | G06F 7/523 708/625 |
| 2004/0267855 A1 | * | 12/2004 | Shantz | G06F 7/5324 708/523 |
| 2009/0077145 A1 | * | 3/2009 | Dobbelaere | G06F 7/5312 708/232 |

* cited by examiner

*Primary Examiner* — Hung T Vy
(74) *Attorney, Agent, or Firm* — Nixon & Vanderhye P.C.

(57) ABSTRACT

An apparatus comprises: selection circuitry to select the two most preferred items from a set of items having ranking information indicative of an order of preference for the set of items. The selection circuitry comprises at least one selection node circuit, each selection node circuit to receive as inputs an indication of a first pair of items and a second pair of items among the set of items, and comprises first selection circuitry and second selection circuitry. The first selection circuitry to first selection circuitry to select as a first selected item a most preferred one of: a most preferred ranked item of the first pair, and a least preferred item of the second pair. The second selection circuitry to select as a second selected item a most preferred one of: a least preferred item of the first pair, and a most preferred item of the second pair.

15 Claims, 5 Drawing Sheets

| item number | Item | Index |
|---|---|---|
| 0 | ida | 0 0 0 1 |
| 1 | idb | 0 0 1 0 |
| 2 | idc | 0 1 0 0 |
| 3 | idd | 1 0 0 0 |
| | invalid item | 0 0 0 0 |

| | A B C D |
|---|---|
| mask a | 0 0 0 1 |
| mask b | 1 0 0 1 |
| mask c | 1 1 0 1 |
| mask d | 0 0 0 0 |

ITEM SELECTION APPARATUS

BACKGROUND

Technical Field

The present technique relates to an apparatus and method for selecting preferred items from a set of ranked items.

Background

When selecting preferred items from a set of ranked items an apparatus may first select the most preferred item from the set, then from the items remaining in the set select the next most preferred item. However, selecting multiple preferred items sequentially in this way consumes a lot of power and incurs a significant delay on processing.

SUMMARY

In one example arrangement there is provided an apparatus comprising:
selection circuitry to select two most preferred items from a set of items having associated ranking information indicative of an order of preference for the set of items, said selection circuitry comprising at least one selection node circuit, each selection node circuit to receive as inputs an indication of a first pair of items and a second pair of items among the set of items, and comprising:
first selection circuitry to select as a first selected item a most preferred one of:
a most preferred item of the first pair, and
a least preferred item of the second pair, and
second selection circuitry to select as a second selected item a most preferred one of:
a least preferred item of the first pair, and
a most preferred item of the second pair.

In a second example arrangement there is provided an apparatus comprising:
means for selecting two most preferred items from a set of items having associated ranking information indicative of an order of preference for the set of items, said means for selecting comprising at least one selection node circuit means, each selection node circuit means to receive as inputs an indication of a first pair of items and a second pair of items among the set of items, and comprising:
means for selecting as a first selected item a most preferred one of:
a most preferred item of the first pair of items, and
a least preferred item of the second pair, and
means for selecting as a second selected item a most preferred one of:
a least preferred item of the first pair, and
a most preferred item of the second pair.

In a third example arrangement there is provided a method for selecting two most preferred items from a set of items having ranking information indicative of an order of preference for the set of items, said method comprising:
processing the set of items using at least one selection node circuit;
each selection node circuit receiving as inputs an indication of a first pair of items and a second pair of items among the set of items, and each selection node circuit performing:
selecting as a first selected item a most preferred one of:
a most preferred item of the first pair, and
a least preferred item of the second pair, and
selecting as a second selected item a most preferred one of:
a least preferred item of the first pair, and
a most preferred item of the second pair.

BRIEF DESCRIPTION OF THE DRAWINGS

The present invention will be described further, by way of example only, with reference to embodiments thereof as illustrated in the accompanying drawings, in which.

DESCRIPTION OF EXAMPLES

Before discussing specific examples with reference to the accompanying figure, the following description is provided.

In accordance with one example, an apparatus comprises selection circuitry to select two most preferred items from a set of items having associated ranking information indicative of an order of preference for the set of items, said selection circuitry comprising at least one selection node circuit, each selection node circuit to receive as inputs an indication of a first pair of items and a second pair of items among the set of items. The present technique recognises that when two most preferred items from a set of items are required for selection, the relative ranking between the two most preferred items may not be required for efficient processing. Thus the selection circuitry of the present technique comprises: first selection circuitry to select as a first selected item a most preferred one of: a most preferred item of the first pair, and a least preferred item of the second pair, and second selection circuitry to select as a second selected item a most preferred one of: a least preferred item of the first pair, and a most preferred item of the second pair. This configuration is unusual in that the order of selection, i.e. which item is selected by the first selection circuitry and which item is selected by the second selection circuitry, is not indicative of the relative ranking between the two most preferred items. However, this arrangement allows the first and second selected items to be selected in a manner that is faster, and requires less power, than if the particular ranking between the first and second selected items were also accounted for in the selection, for example. Therefore, a more efficient apparatus is provided.

In some examples, the first selection circuitry is configured to select the first selected item in parallel with the second selection circuitry selecting the second selected item. The first and second selection circuitry may be arranged to determine the two most preferred items in a manner where the selection at one of the first and second selection circuitry is independent of the selection at the other of the first and second selection circuitry, and so a parallel arrangement can be implemented to further improve efficiency for example.

In some examples, the apparatus comprises a 4:2 compression tree comprising a plurality of the selection node circuits arranged in a tree structure to reduce a set of N items to two most preferred items, where N>4. By using a tree of 4:2 reductions with each reduction performed using the selection node circuit discussed above, the apparatus can thus be straightforwardly scaled to select two most preferred items from a set of ranked items of any size.

In some examples, a subset of unused inputs of the 4:2 compression tree are tied to zero. Thus the apparatus can be reconfigured in a simple to manner to vary the number of inputs.

In some examples, a mapping between the two most preferred items and the first and second selected items selected by the at least one selection node circuit is dependent on an initial arrangement of the items within the set. Furthermore, in some examples, when the apparatus comprises a 4:2 compression tree comprising a plurality of said selection node circuits arranged in a tree structure to reduce a set of N items to two most preferred items, where N>4, a mapping between the two most preferred items and the first and second selected items selected by the at least one selection node circuit is dependent on an initial arrangement of the items within the set. Since which one of the two most preferred items that is selected by either the first and second selection circuitry is dependent on the relative order that the set of items are input to the apparatus, and may not be indicative of the ranking between the two most preferred items, which of the two most preferred items is selected by each of the first and second selection circuitry is unpredictable. That is, it is known that the two most preferred items will be selected, but not which of these will be selected by the first selection circuitry and which will be selected by the second selection circuitry. It is counter-intuitive to arrange an apparatus for selecting preferred items in this manner as one would normally expect the outputs of a selector to provide predictable results based on the relative rankings. However, the present technique recognises that, for example, when subsequent processing of the two most preferred items is symmetrical, the relative ranking between the two most preferred items may not be important for processing of the items. Thus these somewhat less precise selection results can be readily accepted to achieve more efficient processing.

In some examples, the selection circuitry is configured to receive for each of the set of items, item information comprising an item index of the item and an item ranking mask indicative of a relative ranking between the item and each other item of the set. In such a configuration, a bit in the item ranking mask representing a more preferred item can be used to mask the item index of less preferred items, allowing for a fast and efficient logic design to be implemented for selecting the two most preferred items.

In some examples, the item index is one-hot encoded. This encoding simplifies the logic required for selection through the masking of the one hot encoded index of less preferred items with the corresponding bit of the ranking mask representing a more preferred item.

The one-hot encoding for a given item can be provided by shifting a valid bit indicating the validity of the given item by a number of bit positions corresponding to an item number associated with the given item (where the item number is a unique value assigned to each item). Encoding the index in this way provides an efficient way of excluding any invalid items from being selected.

In some examples, the set of items comprises a set of instructions and the apparatus comprises issue circuitry to issue the two most preferred instructions for processing by first and second processing elements. The selection of instructions for processing by processing elements is one example of a scenario where the order between the two most preferred instructions may not be important for efficient processing to be performed.

For example, when the set of instructions comprises instructions capable of being processed by both the first and second processing elements, either instruction can be selected for processing by either processing element. Thus information regarding the ranking between the two most preferred instructions is not required for further processing to be performed by the first and second processing elements. The present technique takes advantage of this characteristic to quickly and efficiently select the most preferred ranking instructions without unnecessarily performing processing accounting for the ranking between the two most preferred instructions.

In some other examples, the apparatus comprises memory control circuitry to control access to memory in response to memory transactions, wherein the set of items comprises a set of pending memory transactions. The selection of pending memory transactions is another example of a scenario where the order between the two most preferred memory transactions may not be relevant for efficient servicing of the memory transactions to be provided.

In some examples, the set of items comprises cache entries of a cache. For example, the selected entries may be selected for eviction from the cache. Eviction may be based on least recently used information and the cache may comprise a data or instruction cache, or an address translation cache (e.g. a TLB) for caching address translation data or page table entries.

In some examples, the associated ranking information ranks the set of items according to one of: item age and; and item priority. Often when processing most preferred items according to their age, or their priority, all that is needed for efficient processing is selection of the two old/youngest, or two highest priority/lowest priority items. The present technique provides this selection in a more efficient manner that does not account for the relative age, or priority, between the two items.

In some examples, said most preferred items comprise higher ranking items. Thus the two highest ranked items from the set of items are selected as the most preferred items. For example, these could be the highest priority items.

In some other examples, said most preferred items comprise lowest ranking items. Thus the two lowest ranked items from the set of items are selected as the most preferred items. For example, in some cases the lowest priority items may be preferred to be selected (e.g. for selecting entries from a cache for eviction, the lowest priority items may be preferred).

Particular examples will now be described with reference to the figures.

Figure 1A:
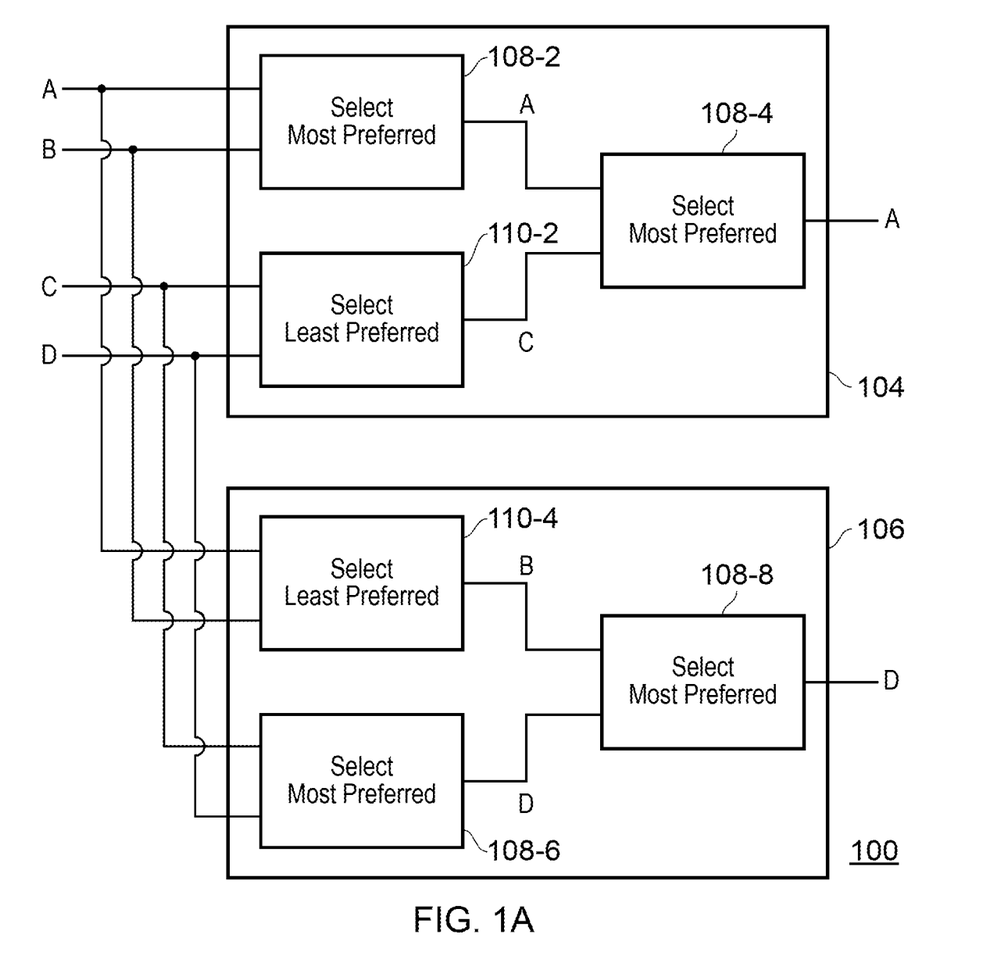
FIG. 1A illustrates one example of an apparatus according to the present technique.
Figure 1B:
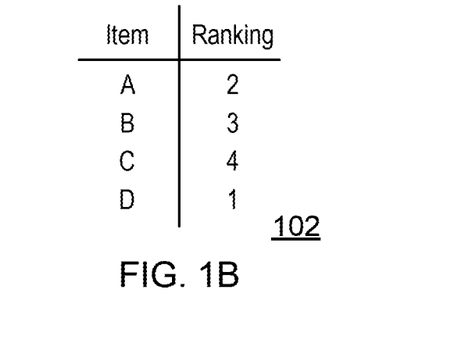
FIG. 1B shows a ranking table for a set of four ranked items.

FIG. 1A shows an example of an apparatus 100 according to the present technique and FIG. 1B shows a ranking table 102. The apparatus 100 comprises a first selection circuit 104 and a second selection circuit 106. Each selection circuit includes select most preferred circuitry 108, configured to select the most preferred item from two inputs and select least preferred circuitry 110, configured to select the least preferred ranking item from two inputs. In the ranking table 102, an item having a smaller ranking value is more preferred than an item having a larger ranking value. Therefore, the items in FIG. 1B are ranked in descending order from a most preferred item having the smallest ranking value of '1' to a least preferred item having the largest ranking of '4'. As shown, the items are input to the apparatus 100, and the select most preferred circuitry 102 and select least preferred circuitry 110 of each selection circuit are arranged to output the two most preferred items from the set.

A property of the apparatus 100 is that which of A and D are output by either selection circuit 104, 106 is dependent on which inputs the items are provided on. For example, if the values of A and D were reversed on the inputs of the apparatus 100, then D would be output by the first selection circuitry 104, whilst A would be output by the second selection circuitry 106. This unusual characteristic arises due to the configuration of the select most preferred circuitry 108 and select least preferred circuitry 110, which are arranged to provide the two most preferred ranking items in a manner that does not account for the relative ranking between the two most preferred ranked items. However, this arrangement allows for more efficient and faster selection of the items to be performed as the depth of the logic forming selection circuitry 104, 106 is reduced (fewer gate delays in reaching the output).

With respect to the ranking table 102 of FIG. 1B, it will be appreciated that in some other systems an item having a larger ranking value is more preferred than an item having a smaller ranking value. For example, the items of the ranking table 102 in this alternative system would be ranked from a most preferred item having the largest ranking value of '4' to a least preferred item having the smallest ranking of '1'.

Figure 2:
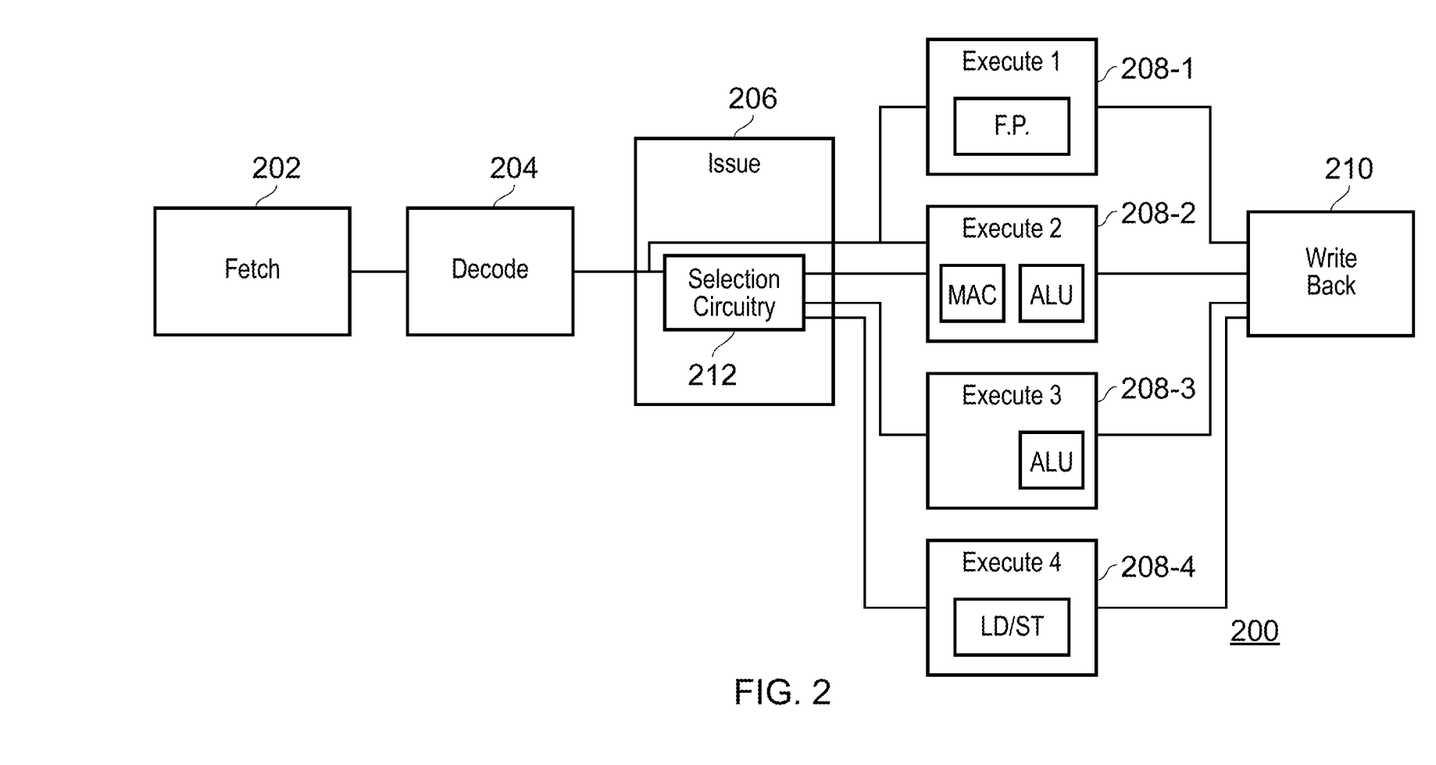
FIG. 2 illustrates a processing pipeline comprising selection circuitry according to the present technique.

FIG. 2 shows a processing pipeline 200. The pipeline comprises a fetch unit 202 configured to fetch instructions from an instruction register, and a decode unit 204 configured to decode the fetched instructions. Once decoded, the issue unit 206 issues the instructions to one of the execute units 208, after which the write back 210 unit writes back the result of the execution.

The execute units 208 are configured to perform different types of processing operations in response to different types of instruction. Execute1 includes floating point (FP) processing circuitry for performing floating point operations in response to floating point instructions, whilst Execute2 208-2 and Execute3 208-3 include arithmetic logic units (ALUs) for performing arithmetic operations, (e.g. add/subtract) in response to arithmetic instructions. Execute2 also includes multiply accumulate circuitry (MAC) for performing multiply-accumulate operations. The processing pipeline 200 also includes Execute4, comprising a load store unit (LD/ST) for performing load/store operations in response to load/store instructions. Since Execute2 and Execute3 are both capable of performing arithmetic operations, for the issue of arithmetic instructions Execute2 and Execute3 can be considered as symmetrical execution units, since either can perform the required operations. This is the case despite Execute2 include MAC circuitry, which is not included in Execute3. Therefore, when the issue unit 206 issues arithmetic instructions it is not important which of Execute2 or Execute3 receive the instruction. Therefore, when a plurality of arithmetic instructions are queued for issue, the selection circuitry 212 is arranged in the manner described with reference to FIG. 1, to select the two highest ranking arithmetic instructions for issue to Execute2 and Execute3. Instructions other than arithmetic instructions, such as floating point instructions and load/store instructions may be issued directly to the appropriate one of the execute units 208, bypassing the selection circuitry 212.

Figure 3A:
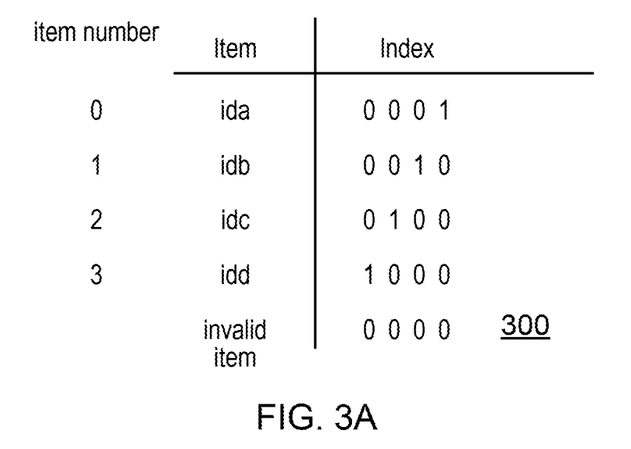
FIG. 3A shows a table of one-hot encoded indexes for a set of four items.
Figure 3B:
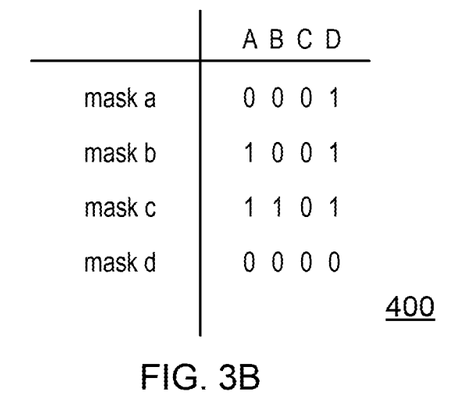
FIG. 3B shows an age matrix indicating the ranking of the four items.

FIGS. 3A and 3B show one example of a data format for the ranking of items.

FIG. 3A shows a table 300 of item indexes for a set of four items. The indexes shown in FIG. 3A are formed by left shifting a given item's valid bit by it's item number, each item being assigned a unique item number. The indexes are thus one-hot encoded, such that the position of the '1' in the 4-bit value can be used to identify the corresponding item. The one-hot encoding is obtained by left shifting each item's valid bit by a number of bit positions corresponding to the item number (e.g. item 0 is represented by index 0001, item 1 by index 0010, and so on). By forming the indexes in this manner, any invalid items, which will have a valid bit value of '0', will also have a corresponding index of all '0's. An all '0' value will simply propagate through a selection circuitry according to the present technique, and will not affect the selection of the two highest ranking items. Therefore, this encoding provides a simple and efficient way of indexing ranked items in a manner that also passively negates any invalid items.

The indexes are one-hot encoded, such that the position of the '1' in the 4-bit value is indicative of the item.

FIG. 3B shows an age matrix comprising a ranking mask for each item. The ranking masks of each item are represented by each row of the age matrix, which indicate the age of a given item relative to the other items in the set, with and a '1' indicating that the item of interest is ranked lower than the corresponding item in a column, and a '0' indicating that the item of interest is not ranked lower than the corresponding item in a column. For example, D is the highest ranked item, and thus has a ranking mask of '0000' as it is not ranked lower than any of the other items in the set. B is ranked higher than C, but lower than A and D, and thus has a ranking mask of '1001'. The overall order ranked from highest to lowest is thus: D, A, B, C.

Figure 4:
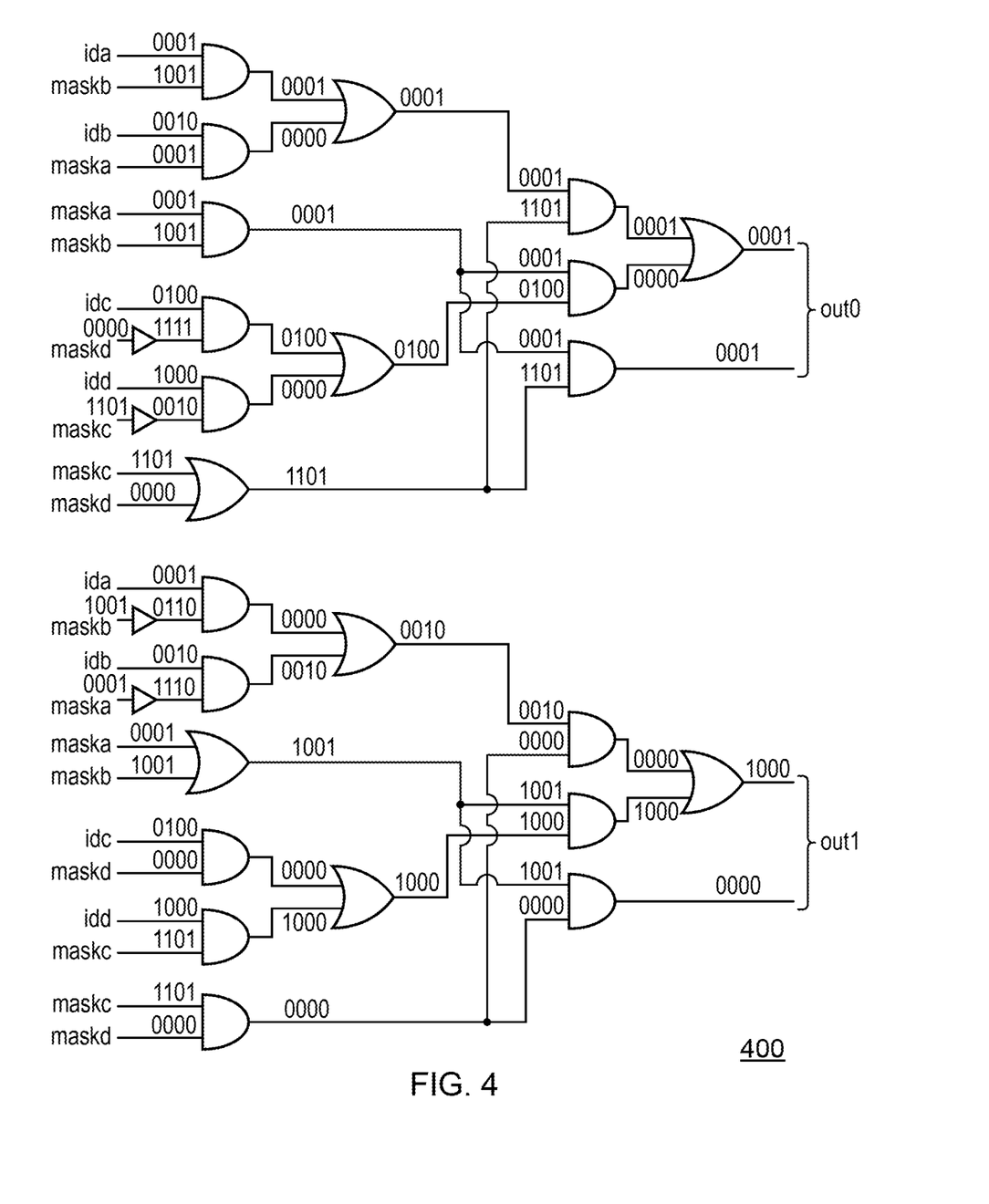
FIG. 4 schematically illustrates selection logic according to the present technique.

FIG. 4 is one example of selection logic 400 arranged to, for a set of four items extract an unordered pair of highest ranked items as:
out(0)=oldest(oldest(a,b),youngest(c,d))
out(1)=oldest(youngest(a,b),oldest(c,d))

The selection logic 400 is configured to receive item data in the format described with reference to FIG. 3A and FIG. 3B, comprising a one-hot encoded index and a ranking mask for each of the four ranked items. The specific exemplary values shown in FIGS. 3A and 3B are shown on the input wires of the selection logic 400, with the output of each individual gate of the selection logic also illustrated. As can be seen, the output out0 comprises the index and ranking mask of item A and the output out1 comprises the index and ranking mask of item D. Thus the selection logic 400 of FIG. 4 is configured to output the two highest ranked items in the set of items, A and D, as an unordered pair where the ranking between the two items cannot be derived from the output position of either item. However, applying the selection logic 400 to situations where such knowledge is not significant means that the two highest ranking items can be provided more quickly and with less power consumption due to the relative small number of logic gates involved.

Figure 5:
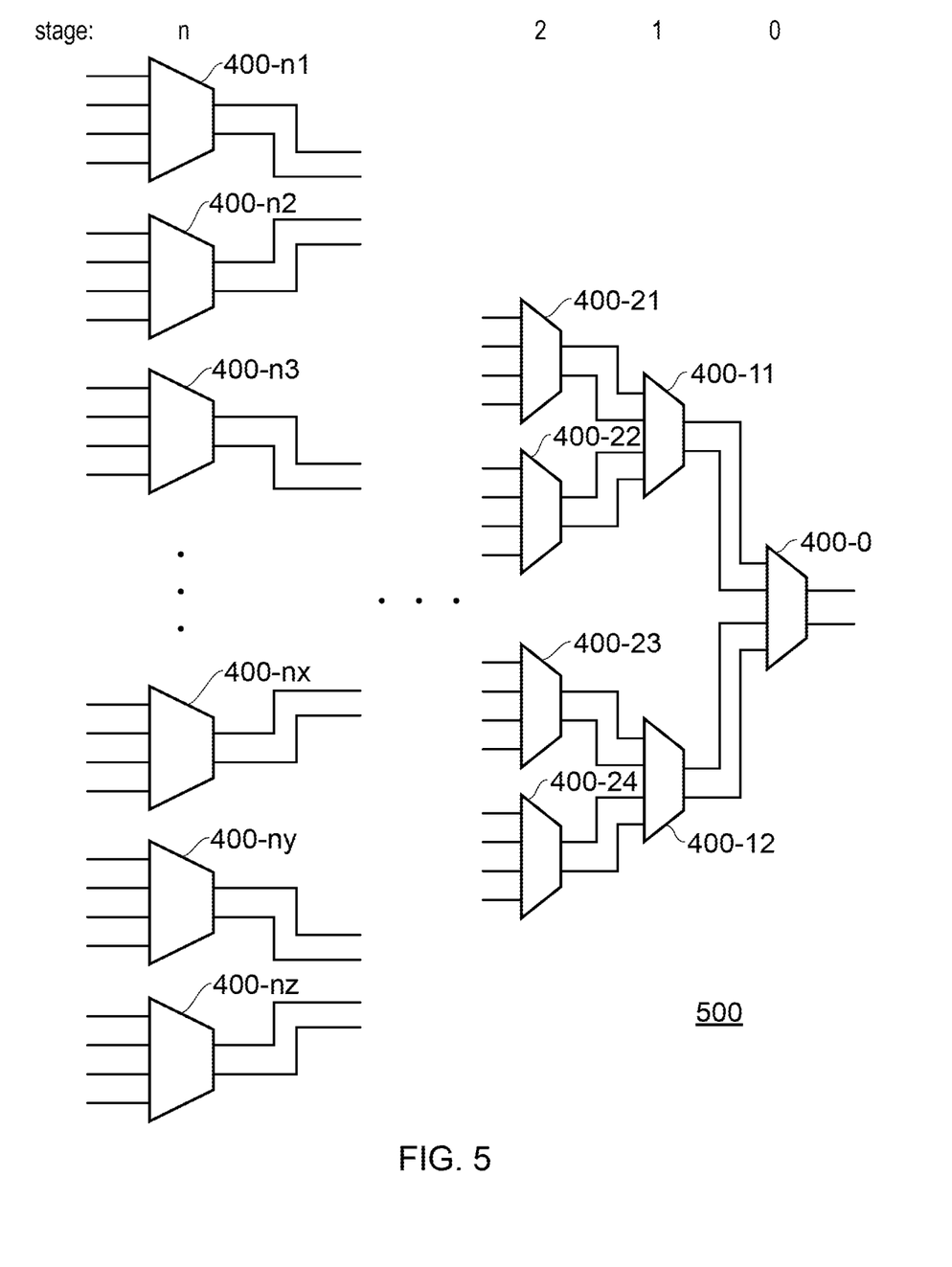
FIG. 5 schematically illustrates a compression tree according to the present technique.

FIG. 5 schematically illustrates a compression tree comprising a number of selection circuits. Each circuit may comprise the selection logic 400 described with reference to FIG. 4 for example, and in this tree structure each instance of selection logic 400 may be considered a node. The compression tree comprises n reduction stages, the final stage corresponding to the $0^{th}$ stage, and each reduction stage comprising $2^n$ nodes. Furthermore, the number of inputs available at the $n^{th}$ stage is given by $2^{n+2}$. Therefore, for any sized set of ranked items, a compression tree 500 such as that of FIG. 5 may be configured with inputs equal to or greater than the number of items in the set, with any unused inputs being tied to '0'. The set of ranked items can then be propagated through the compression tree to select the two highest ranked items of in a manner that is fast, and consumes relatively less amounts of power.

In the examples shown in the drawings, the selection is based on ranking information which expresses an order of preference such that a higher ranked item is considered more preferred than a lower ranked item. However, in other examples a lower ranked item could be considered more preferred (in the order of preference defined by the ranking information) than a higher ranked item (e.g. if the aim is to select the youngest items or the lowest priority items).

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

I claim:

1. An apparatus comprising:
    at least one of: a processor and a memory; and
    selection circuitry to select two most preferred items from a set of items having associated ranking information indicative of an order of preference for the set of items, said selection circuitry comprising at least one selection node circuit, each selection node circuit to receive as inputs an indication of a first pair of items and a second pair of items among the set of items, and comprising:
    first selecting circuitry to select as a first selected item a most preferred one of:
        a most preferred item of the first pair, and
        a least preferred item of the second pair, and
    second selecting circuitry to select as a second selected item a most preferred one of:
        a least preferred item of the first pair, and
        a most preferred item of the second pair;
    wherein the first selecting circuitry is configured to select the first selected item in parallel with the second selecting circuitry selecting the second selected item.

2. The apparatus according to claim 1, comprising a 4:2 compression tree comprising a plurality of said selection node circuits arranged in a tree structure to reduce a set of N items to two most preferred items, whereN>4.

3. The apparatus according to claim 1, wherein a mapping between said two most preferred items and said first and second selected items selected by said at least one selection node circuit is dependent on an initial arrangement of the items within said set.

4. The apparatus according to claim 1, wherein said selection circuitry is configured to receive, for each of said set of items, item information comprising:
    an item index of the item; and
    an item ranking mask indicative of a relative ranking between the item and each other item of the set.

5. The apparatus according to claim 4, wherein the item index for a valid item is one-hot encoded.

6. The apparatus according to claim 5, wherein the item index for a given item comprises a valid bit indicating the validity of the given item shifted by a number of bit positions corresponding to an item number associated with the given item.

7. The apparatus according to claim 1, wherein said set of items comprises a set of instructions and the apparatus comprises issue circuitry to issue the two most preferred instructions for processing by first and second processing elements.

8. The apparatus according to claim 7, wherein the set of instructions comprises instructions capable of being processed by both the first and second processing elements.

9. The apparatus according to claim 1, comprising memory control circuitry to control access to memory in response to memory transactions, wherein said set of items comprises a set of pending memory transactions.

10. The apparatus according to claim 1, wherein the set of items comprises cache entries of a cache.

11. The apparatus according to claim 1, wherein the associated ranking information ranks the set of items according to one of:
    item age; and
    item priority.

12. The apparatus according to claim 1, wherein said most preferred items comprise higher ranking items.

13. The apparatus according to claim 1, wherein said most preferred items comprises lower ranking items.

14. An apparatus comprising:
    at least one of: a processor and a memory
    means for selecting two most preferred items from a set of items having associated ranking information indicative of an order of preference for the set of items, said means for selecting comprising at least one selection node circuit means, each selection node circuit means to receive as inputs an indication of a first pair of items and a second pair of items among the set of items, and comprising:
    means for performing a first selection, to select as a first selected item a most preferred one of:
        a most preferred item of the first pair of items, and
        a least preferred item of the second pair, and
    means for performing a second selection, to select as a second selected item a most preferred one of:
        a least preferred item of the first pair, and
        a most preferred item of the second pair;
    wherein the means for performing a first selection is configured to select the first selected item in parallel with the means for performing a second selection selecting the second selected item.

15. A method for selecting two most preferred items from a set of items having ranking information indicative of an order of preference for the set of items, said method comprising:
    processing the set of items using at least one selection node circuit in an apparatus comprising at least one of: a processor and a memory:
    each selection node circuit receiving as inputs an indication of a first pair of items and a second pair of items among the set of items, and each selection node circuit performing:
        selecting as a first selected item a most preferred one of:

a most preferred item of the first pair, and
a least preferred item of the second pair, and
selecting as a second selected item a most preferred one of:
a least preferred item of the first pair, and
a most preferred item of the second pair;
wherein the first selected item and the second selected item are selected in parallel.

\* \* \* \* \*